No. 635,833. Patented Oct. 31, 1899.
F. S. WOODWARD.
CONDUIT ROD.
(Application filed Feb. 28, 1899.)
(No Model.)
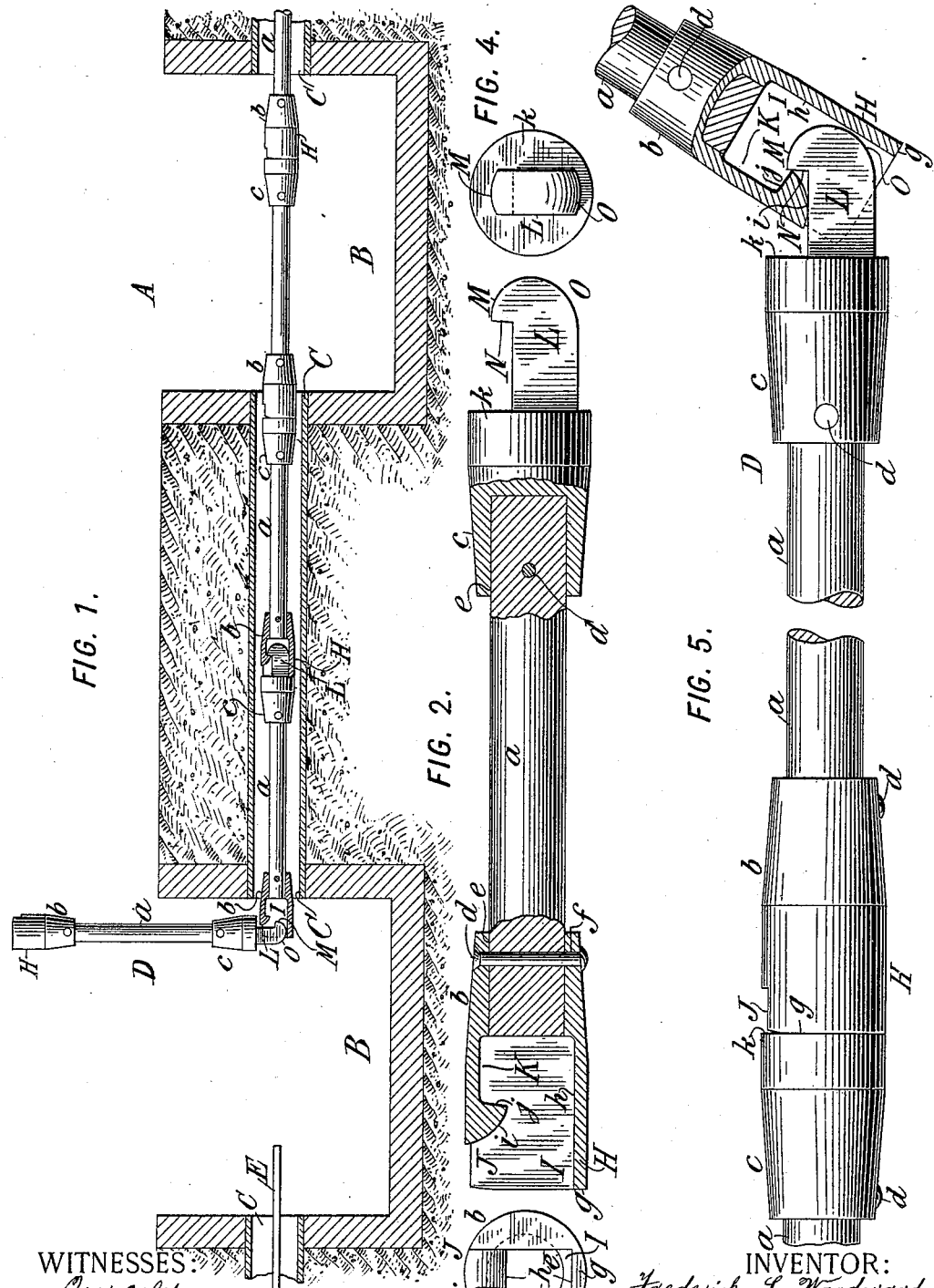
WITNESSES:
Fred White
Thomas F. Wallach
INVENTOR:
Frederick S. Woodward,
By his Attorneys.
Arthur F. Fraser

UNITED STATES PATENT OFFICE.

FREDERICK S. WOODWARD, OF NEW YORK, N. Y.

CONDUIT-ROD.

SPECIFICATION forming part of Letters Patent No. 635,833, dated October 31, 1899.

Application filed February 28, 1899. Serial No. 707,148. (No model.)

*To all whom it may concern:*

Be it known that I, FREDERICK S. WOODWARD, a citizen of the United States, residing in the borough of Brooklyn, Kings county, city and State of New York, have invented certain new and useful Improvements in Conduit-Rods and other Sectional Devices, of which the following is a specification.

This invention relates to sectional articles—
such as push-rods for the conduits of subways, rods for flue-cleaners, and similar devices— and aims to provide an improved rod especially applicable as a push-rod for underground conduits, but which is also applicable to the general uses for which sectional rods or devices may be employed.

In electrical subways it has been common to introduce the conductive cable into the conduit by inserting short lengths of screw-threaded rods or pipes into the conduit from one manhole and screwing a succeeding length of pipe to that inserted in the conduit before the first length has passed entirely within the conduit. As the diameter of the manholes is usually approximately three feet, a number of lengths of pipe have to be thus connected together, and the coupling of the successive lengths must be done while they are in axial alinement. The length within the conduit must be held against rotation during screwing of the added length to its protruding end, and the united sections must be accordingly prevented from becoming unscrewed while within the conduits. Screwing of sections together is an exact and tedious and sometimes a difficult operation, making the progress of laying the conductors both slow and expensive. In laying conductors in this way it is common to fasten a small wire to the last length of pipe inserted—*i. e.*, that which suffices to push the first section sufficiently into the next manhole to be grasped— which wire is drawn through the conduit with the drawing of the pipes therethrough, so that the cable containing the electric conductor or conductors can be attached to the other end of the wire and drawn into the conduit by means of a windlass or other source of power applied to the other end of the small wire for advancing it through the conduits.

My invention aims to provide a sectional rod which can be more conveniently and rapidly connected at its joints than heretofore, which will require the minimum of room for manipulation in coupling and uncoupling added or withdrawn sections, and which shall be simple, cheap, and strong, and free from any danger of independent rotation of the sections.

To this end in carrying out the preferred form of my invention as applied to conduit-rods I provide sections having male and female coupling provisions at their respective ends of improved construction, adapted to engage by lateral engagement and locked by swinging the one relatively to the other around an axis at right angles to the longitudinal extension of the rod, the rod being preferably made of small light intermediate sections and attached coupling provisions, and I provide an improved construction of coupling consisting of reciprocal male and female members, the one having an axial socket and an internal locking-face and a lateral socket and the other having an axial tongue having a projecting face for passing behind and interlocking with that of the first, said tongue adapted to swing through the lateral socket of the first, and I provide both parts with abutting faces drawn together by the interlocking of the coupling and adapted to transmit all compressive strains from one coupling to the next. The coupling-socket and tongue prevent independent rotation of the parts around the longitudinal axis of the rod, and they prevent collapse of the joint laterally in any direction except that through which the joints swing to lock them together. The couplings are preferably made of cast metal and the intermediate portions of solid wooden rods or thin metal tubes rigidly connected to the couplings at their ends.

In the accompanying drawings, Figure 1 shows, diagrammatically, a section of a subway in which my improved push-rod is being utilized. Fig. 2 is an enlarged section, partly in elevation, of one section of the improved push-rod. Fig. 3 is an end view of one end thereof. Fig. 4 is an end view of the other end thereof. Fig. 5 is a side elevation showing two sections united and a third coupling in section in the act of disengaging.

Referring to the drawings, let A indicate a subway; B, the manhole thereof; C, the conduits thereof; E, the drawing-wire for pulling the cable through the conduits, and D my improved push-rod as a whole. In their general features all these parts may be of any usual or suitable construction or arrangement. Ordinarily an operator stands in each manhole and one screws on successive sections of the push-rod as fast as he pushes the rod into the conduit, the other unscrewing these sections as fast as the rod feeds into the next manhole or directs the rod through the succeeding conduit. The drawing-wire is fastened to the last section and drawn through to the next manhole, where its protruding end is pulled by windlass or otherwise with sufficient force to draw through the conductor. The maximum diameter of the manhole—usually three feet—is sometimes materially reduced by the network of conductors crossing it, and the length of the sections of the push-rod must of necessity be such that each section can be screwed onto the next within this contracted space. A sufficient end of the inserted section must be left to permit grasping of it, so that it will not turn when a new section is being screwed on, and considerable power must be used to firmly unite the sections. The sections are necessarily considerably shorter than the diameter of the manhole.

I will now describe in detail the construction of the preferred form of my invention, referring to Figs. 2 to 5, inclusive, in which $a$ represents the middle portion or rod proper of a section, $b$ the female coupling end of the section, and $c$ the male coupling end thereof. The middle or body portion $a$ of the sections may be of any suitable form or material, a solid cylindrical bar of wood being shown. It is preferably but not necessarily formed as a separate piece distinct from the coupling portions $b$ and $c$ and rigidly connected thereto in any suitable manner, as by the riveted cross-pins $d$, traversing the outer ends of the body and the inner ends of the heads, the heads being shown in this construction as formed with sockets $e$, receiving and fitting the ends of the body $a$, and with cross-holes $f$, through which the pins $d$ pass. The coupling-heads are of cast-iron or other suitable material, the one having female and the other male coupling provisions which are reciprocal to each other, and the heads and rod constitute a complete section adapted at one end for engagement with the male coupling-head of an adjacent section and at the other end for engagement with the female coupling-head of a succeeding section.

The female coupling-head $b$ is of improved construction and in its preferred form consists of an externally-cylindrical body H, slightly tapered at its inner end and having a flat end wall or face $g$, through which opens a longitudinal socket I, extending inwardly axially of the body H and preferably communicating with the socket $e$ thereof, a lateral recess J, and an internal pocket K. The socket I has flat bottom, side, and top walls $h$ and is rectangular in cross-section. The recess J is a radial continuation of the socket I and extends through the outer wall of the body. The pocket K is a lateral cavity in the body communicating with the socket I. The inner wall $i$ of the recess J is an inclined or curved wall, and the front wall of the pocket K is a right-angle or other suitably-disposed wall and constitutes a locking-face $j$.

The male member $c$ is preferably a cylindrical body having an outwardly-coned and internally-socketed inner end and a solid outer wall $k$, crossing its outer end at right angles, from which wall it is provided with the projecting tongue or lug L, having a lateral projection M, having a shoulder or face N, which is adapted to engage and constitutes a reciprocal locking-face to the face $j$ of the head $b$. The walls of the tongue L are substantially flat and its cross-section is approximately rectangular, but its outer end is rounded off in the form of a curved wall O.

In uniting the couplings the tongue L of the male coupling is passed into the recess J of the female coupling until the hook M has entered the socket I. The one section is then swung downwardly until it is brought into alinement with the other section, this operation causing the hook of the tongue to rise into the pocket K, so that the walls $j$ and N engage. The conformation of the walls is such that as they engage they will wedge together as one rides on the other and draw the abutting end faces $g$ $k$ of two engaging members into intimate contact. This will hold the members together in an approximately rigid manner, and the engaging side walls of the socket and tongue will prevent any rotation of the one member independently of the other, while these faces will also prevent sagging of the one member relatively to the other except in the direction necessary to uncouple the members. Either member may be uncoupled from the other by swinging the member to be attached on an axis at right angles to its longitudinal axis until the tongue has entered the recess sufficiently to disengage the hook from the pocket. Then the members can be drawn apart until the tongue is free from the socket.

In use the one member may be inserted in the conduit until only its tongue projects in the manhole, and then the other member can be dropped down vertically until its socket passes over the tongue and then swung to a horizontal position to lock the parts together. This enables the use of a length substantially equaling the diameter of the manhole. When the parts are engaged and inserted into the conduit, the latter will prevent their axial deflection, and consequently render their separation impossible. The abutting faces will carry the compression strains of use, and their interlocking faces will take any tension strains, so that force can be applied to the assembled push-rod at either end. The assembling and disconnection of sections can be done with great rapidity and without the necessity of holding the end of the one in the conduit while connecting or disconnecting the section in the manhole. The coupling will transmit rotary motion from one section to another without danger of disconnecting the sections, thus facilitating passage of the rod through the conduit in case of obstruction in the latter.

It will be seen that my invention provides improvements in sectional articles and in couplings therefor which can be readily and advantageously availed of, and it will be understood that the invention is not limited to the particular details of construction nor to the particular use set forth as constituting its preferred form and adaptation, since it can be employed according to such modifications as circumstances or the judgment of those skilled in the art may dictate and for various purposes without departing from the spirit of the invention.

What I claim is—

1. In push-rods for conduits and other devices, a plurality of sections adapted to be coupled together, having at one end a male and at the other end a female coupling-head, and an intermediate body connecting said heads, the female head of each section comprising an axial socket having a closed bottom wall and an internal locking-face, and the male head of each section comprising a longitudinal tongue adapted to enter the said socket of a female head, and having a lateral locking-face for passing inwardly of and engaging the locking-face of said female section, and being guided into engagement therewith by said bottom wall, and means preventing rotation of one section relatively to another.

2. In push-rods for conduits and like articles, a plurality of separable sections each consisting of a male and female coupling-head and an intermediate body, said male coupling-head having a tongue having a projecting locking-face, and said female head having a longitudinal socket, a lateral socket leading through its side and communicating with said longitudinal socket, a closed bottom wall an internal locking-face, and a closed top wall inwardly of said locking-face, said tongue adapted to enter the sockets of one of said female heads at an angle to the longitudinal axis thereof, and to be swung around an angle at right angles to such longitudinal axis when in said socket, and when so swung into line with such axis engaging its locking-face with the internal face of said socket.

3. In sectional push-rods for conduits and like articles, a rod consisting of a plurality of separable sections each having a female coupling-head at one end and a male coupling-head at the other end, and having reciprocal abutting end faces on said heads for engaging and transmitting compression strains from one to the other, said female head having a longitudinally-extending socket and a locking-face within said socket, and closed bottom and top walls, and said male head having a longitudinally-projecting tongue entering said socket, and having a laterally-projecting locking-face passing behind and engaging the locking-face of the female head, and engaging provisions carried by said heads preventing rotary motion of either around the axis of the other.

4. For conduit push-rods and similar devices, the improved sectional members consisting each of a male and a female coupling-head, and an intermediate body connecting said heads, each of said heads adapted to engage with the reciprocal head of an adjacent rod, and said female head having a laterally-opening recess, and said male head a locking-tongue for entering said recess and adapted to pass therein when the tongues are angularly disposed, and locking-faces on said heads engaging when the parts are brought into axial alinement and holding the heads interlocked while in such alinement, and means whereby when so engaged the locking-faces of both couplings are practically inclosed and protected.

5. The improved coupling-head for conduit push-rods and other articles, consisting of a body having a longitudinal socket I extending from one end inwardly, a lateral recess J extending from one side into said socket, a pocket K communicating with said socket, a bottom wall extending beneath said socket and a locking-face $j$ at the front side of said pocket.

6. The improved coupling-head for conduit push-rods and other articles, consisting of a body having a longitudinal socket I opening through its end, a lateral recess J communicating between said socket and its side, walls entirely surrounding said socket, a locking-face $j$ within said socket, and a curved wall $i$ for said recess.

7. The improved coupling-head for conduit push-rods and other articles, consisting of a body having an end face $k$, a tongue L projecting therefrom axially of said body, said tongue having a locking-face N and a curved end wall O leading from said locking-face N in a substantially semicircular line to the bottom of said tongue.

In witness whereof I have hereunto signed my name in the presence of two subscribing witnesses.

FREDERICK S. WOODWARD.

Witnesses:
GEORGE H. FRASER,
THOMAS F. WALLACE.